United States Patent [19]
Fant et al.

[11] 3,804,076
[45] Apr. 16, 1974

[54] BABY BOTTLE WARMER
[76] Inventors: John W. Fant, Rt. 7, Anderson, S.C. 29621; David Gene Fant, Rt. 1-Mabry Acres, Williamston, S.C. 29697
[22] Filed: Mar. 30, 1973
[21] Appl. No.: 346,263

[52] U.S. Cl................ 126/261, 126/265, 219/432, 219/439
[51] Int. Cl............................................ A47g 23/04
[58] Field of Search ............ 126/261, 265; 219/430, 219/432, 439

[56] References Cited
UNITED STATES PATENTS
944,307  12/1909  Bauer.................................. 126/265

FOREIGN PATENTS OR APPLICATIONS
6,047    4/1888   Great Britain...................... 126/265
163,918  6/1921   Great Britain...................... 126/261
294,295  11/1953  Switzerland........................ 126/261

Primary Examiner—William F. O'Dea
Assistant Examiner—Peter D. Ferguson
Attorney, Agent, or Firm—Bailey & Dority

[57] ABSTRACT

A warmer for maintaining a baby bottle and the like at a desired temperature includes an elongated insulated housing open at both ends with a cover at the top and a thin foraminous wall or partition carried adjacent the other end above a depending foramious skirt which contains a supply of heated air formed by a heater which is carried in a intermediate portion of a lower compartment which supplies a continuous heat from a glowing mantle which is furnished with fuel from a receptacle formed in the compartment therebelow, said receptacle having a foraminous wall above the heater and a cover constructed of textile material for carrying the warmer.

2 Claims, 3 Drawing Figures

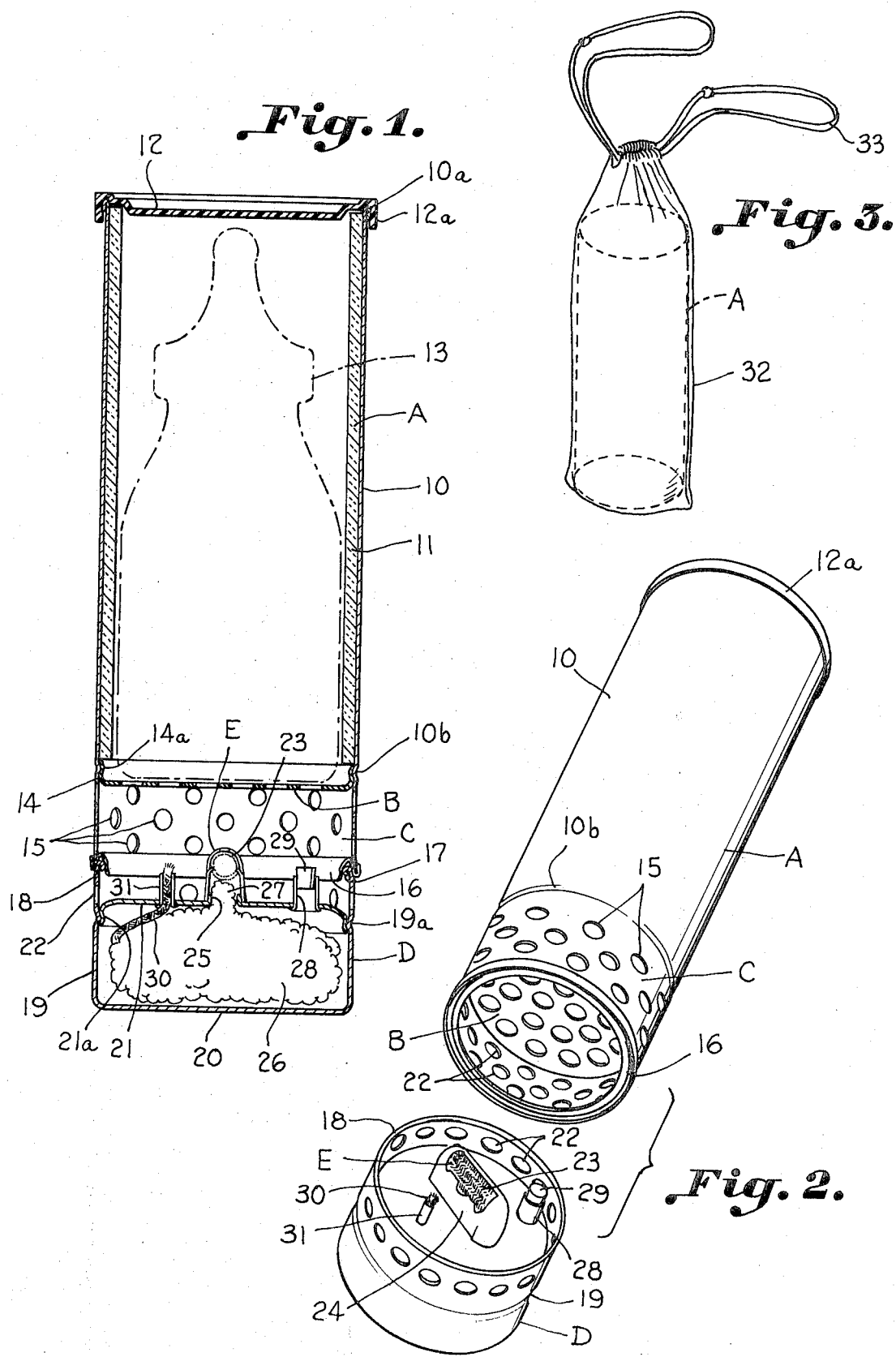

BABY BOTTLE WARMER

BACKGROUND OF THE INVENTION

Any number of receptacles are known to the prior art for carrying liquid or solid food. Most of these devices are incapable of supplying additional heat for maintaining the desired temperature over extended periods of time with the edibles in the container. An example of a prior art device for containing a number of different edibles is illustrated in U. S. Pat. No. 2,575,299. The heating compartment is located at the bottom and a limited space is provided therein for collecting a supply of warm air. It is necessary to utilize a thick metal plate to which flame is directly applied for the purpose of heating the edibles. The flame is then extinguished and the contents stored for a limited period of time. The temperature however is maintained through the insulating qualities rather than through the continuous application of heat. Such devices are bulky and unsuitable for the storage and maintenance of baby bottles and the like of desired temperatures over long periods of time. It is an object of this invention therefore to provide a warmer for a baby bottle and the like capable of supplying heat continuously for the maintenance of a desired temperature and to this end utilizing a compartment heat and supplying air to support the limited components to maintain a glowing mantle.

BRIEF DESCRIPTION OF THE INVENTION

It has been found that a baby bottle warmer which supplies deficiencies in the prior art may be provided by utilizing an insulated housing having a foraminous skirt carried at the bottom for containing a supply of heated air and positioning a receptacle below the skirt having a heater comprising a glowing mantle provided in the medial portion thereof with a supply of fuel therebelow and a foraminous cover thereabove with fastening means for joining same to the skirt.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

BRIEF DESCRIPTION OF THE DRAWING

FIG. 1 is a transverse sectional elevation illustrating a baby bottle warmer constructed in accordance with the present invention, FIG. 2 is a perspective view illustrating the components of the baby bottle warmer illustrated in FIG. 1, and FIG. 3 is a perspective view illustrating a cover for the baby bottle warmer.

DESCRIPTION OF A PREFERRED EMBODIMENT

The drawing illustrates a warmer for a baby bottle and the like constructed in accordance with a preferred embodiment of the invention. An elongated insulated cylindrical housing A is open at both ends for receiving the baby bottle. A cover is positionable adjacent an upper portion of the housing. A foraminous partition B is carried by the housing opposite the cover adjacent a lower end of the housing forming a compartment thereabove sufficient to receive said baby bottle allowing air flow therearound. A foraminous skirt C is carried by the housing below the partition for containing a supply of heated air. A receptacle D having an open end is carried below the skirt and fastening means are provided detachably joining the open end of the receptacle opening into a lower compartment formed at least partially by the skirt below the foraminous partition. Thus, heated air is generated in the lower compartment which flows through the foraminous partition around the baby bottle.

The heater preferably includes a horizontal partition across the compartment defining a fuel receiving area, a wick, a mantle glowing responsive to burning fuel, and the receptacle has openings therein above said horizontal partition. A cover for the warmer is constructed of textile material capable of admitting air to said lower compartment to support burning but excludes air currents as may extinguish burning.

The cylindrical housing A is preferably constructed using a tubular sheet metal portion 10 and a suitable layer of interior insulating material as indicated at 11. The housing A has an open upper end for receiving a cover 12 having a downwardly extending flange 12a which snaps over a bead 10a extending outwardly of the tubular sheet metal portion 10. The cylindrical housing is of sufficient size to provide ample room to receive a baby bottle illustrated in broken lines at 13. The cylinder should be of sufficient size to permit currents of heated air to flow therein around the baby bottle for maintaining same at a desired temperature.

The foraminous partition B is mounted adjacent the opposite end of the cylindrical housing A and carries an upwardly extending flange 14 which has an annular deformation 14a for locking the partition with respect to a locking groove 10b carried by the tubular member 10.

The tubular member 10 continues past the foraminous portion forming a skirt C. A plurality of spaced apertures 15 are carried within the skirt. The free end of the skirt is deformed forming an annular ring 16 defining a groove 17 therein for receiving a receptacle D. The fastening means which includes a deformable ring 16 including an interior bead 18 carried by an upper extension of the receptacle D.

The receptacle D includes a second cylindrical sheet metal portion 19 of relatively short dimension and has a bottom 20 integral therewith. A fastening groove 19a is carried within an intermediate portion of the receptacle D for receiving amounting plate or partition 21 which has a cooperating flanged groove 21a for reception of the interior groove 19a.

The cylindrical walls 19 preferably have apertures 22 therein above the partition 21.

The heater E preferably is of a type including a mantle 23 carried by a housing 24 which snaps over a flange 25 defining an opening in the partition 21. A wicking substance extends upwardly adjacent the mantle as illustrated at 27. An opening for receiving fuel is provided in the form of a tube 28 having a cover in the form of a stopper 29. A wick 30 extends upwardly through a tubular opening 31 which may be ignited for applying heat causing the mantle 23 to flow as a result of ignition of the fuel carried within the wicking substance 26. Preferably a cloth bag 32 is provided for excluding drafts as might extinguish the burning of the fuel. The cloth bag is illustrated as having draw-strings 33.

While a preferred embodiment of the invention has been described using specific terms, such description is for illustrative purposes only, and it is to be understood that changes and variations may be made without departing from the spirit or scope of the following claims.

What is claimed is:

1. A warmer for a baby bottle and the like comprising:
   A. an elongated insulated housing open at both ends for receiving the baby bottle;
   B. a cover positionable adjacent an upper portion of said housing;
   C. a foraminous partition carried by said housing opposite said cover adjacent a lower end of said housing forming a compartment thereabove sufficient to receive said baby bottle allowing air flow therearound;
   D. a foraminous skirt carried by said housing below said partition for containing a supply of heated air;
   E. a receptacle having an open end carried below said skirt;
   F. fastening means detachably joining the open end of said receptacle and a lower end of said skirt;
   G. a heater carried within said receptacle opening into a lower compartment formed by said skirt below the foraminous partition, said heater including;
   H. a horizontal partition across said lower compartment defining a fuel receiving area;
   I. a mantle glowing responsive to burning fuel; and
   J. said receptacle having openings therein above said horizontal partition.

2. The structure set forth in claim 1 including, a cover for said warmer constructed of textile material capable of admitting air to said lower compartment to support burning but excluding air currents as may extinguish burning.

\* \* \* \* \*